United States Patent
Jandin

[19]

[11] Patent Number: 5,974,620
[45] Date of Patent: Nov. 2, 1999

[54] WIPER BLADE AND A METHOD OF MANUFACTURING A WIPER BLADE

[75] Inventor: Patrice Jandin, Hondelange, Belgium

[73] Assignee: Cooper Industries, Inc., Houston, Tex.

[21] Appl. No.: 09/029,885

[22] PCT Filed: Sep. 10, 1996

[86] PCT No.: PCT/EP96/03973

§ 371 Date: Jul. 6, 1998

§ 102(e) Date: Jul. 6, 1998

[87] PCT Pub. No.: WO97/11867

PCT Pub. Date: Apr. 3, 1997

[30] Foreign Application Priority Data

Sep. 11, 1995 [EP] European Pat. Off. .............. 95202451

[51] Int. Cl.⁶ .................................................... B60S 01/38
[52] U.S. Cl. ..................................... 15/250.46; 15/250.31; 29/428; 29/453; 29/505
[58] Field of Search ........................ 15/250.46, 260.451, 15/250.41, 250.44, 250.361, 250.31; 403/157, 150; 29/428, 505, 453

[56] References Cited

U.S. PATENT DOCUMENTS

| | | | |
|---|---|---|---|
| 4,286,351 | 9/1981 | Mower et al. | 15/250.46 |
| 5,073,060 | 12/1991 | Pethers | 15/250.46 |
| 5,271,122 | 12/1993 | Roth et al. | 15/250.46 |
| 5,465,454 | 11/1995 | Chang | 15/250.451 |
| 5,729,861 | 3/1998 | Journee | 15/250.31 |
| 5,742,973 | 4/1998 | Kessler | 15/250.46 |

FOREIGN PATENT DOCUMENTS

| | | |
|---|---|---|
| 354279 A1 | 2/1990 | European Pat. Off. . |
| 500248 A1 | 8/1992 | European Pat. Off. . |
| 3829343 A1 | 3/1990 | Germany . |
| 4411085 A1 | 10/1994 | Germany . |
| 2038167 | 7/1980 | United Kingdom . |
| 2139528 | 11/1984 | United Kingdom . |
| 2186910 | 8/1987 | United Kingdom . |
| 2197023 | 5/1988 | United Kingdom . |
| 2203936 | 11/1988 | United Kingdom . |
| 2220844 | 1/1990 | United Kingdom . |
| 2226754 | 7/1990 | United Kingdom . |
| 2233219 | 1/1991 | United Kingdom . |

*Primary Examiner*—Gary K. Graham
*Assistant Examiner*—Andrew Aldag
*Attorney, Agent, or Firm*—Fish & Richardson P.C.

[57] ABSTRACT

A wiper blade includes a metal carrier, a metal yoke, and a plastic joint part. The metal yoke is attached to the metal carrier in a way the permits the yoke to pivot about a pivot axis. The joint part is interposed between the metal carrier and the metal yoke, and is stationary with respect to the carrier. Both the carrier and the yoke have a substantially U-shaped cross-section at the location at which the joint part is interposed between them, and the yoke is positioned substantially within said carrier. At least one leg of the U-shaped cross-section of the yoke includes a protrusion formed as part of the yoke at the location of the pivot axis. The protrusion pivotally engages in the joint part. The carrier has at least one hole provided coaxially with the pivot axis. A cylindrical portion of the joint part is provided through the hole, and the protrusion of the yoke extends into the cylindrical portion. A method of manufacturing a wiper blade is also disclosed.

9 Claims, 11 Drawing Sheets

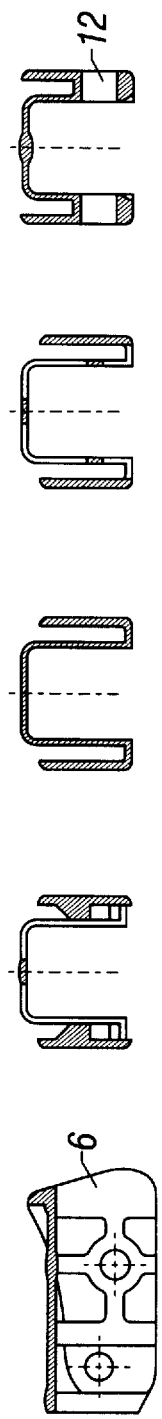
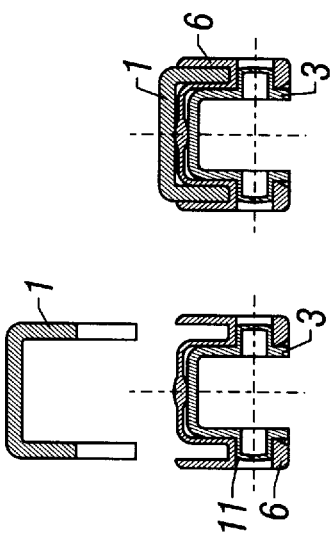
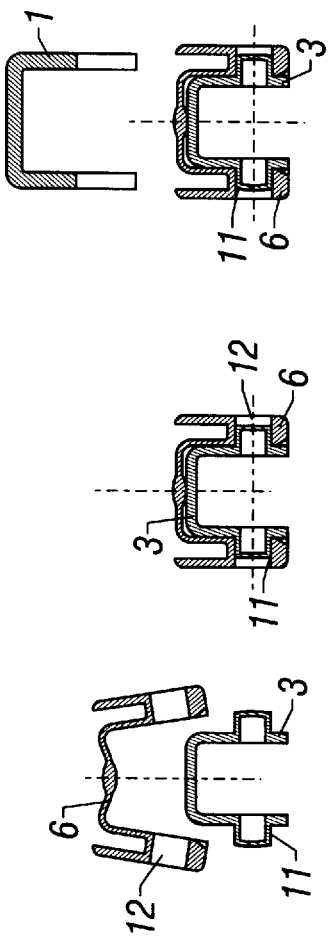
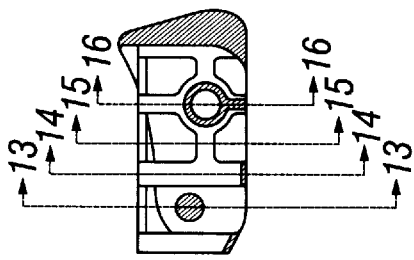

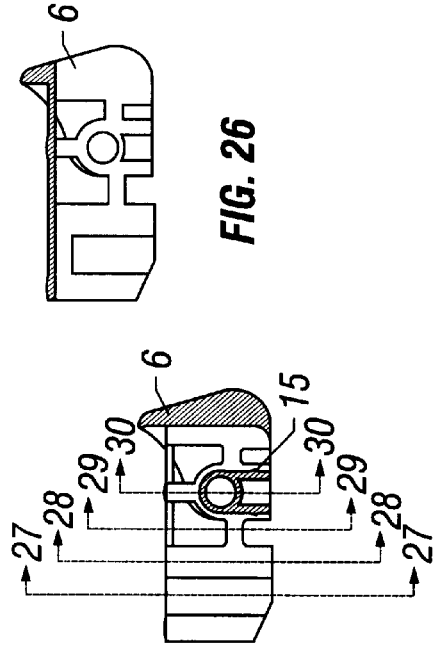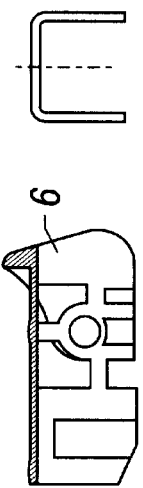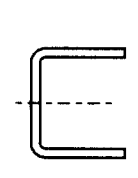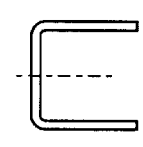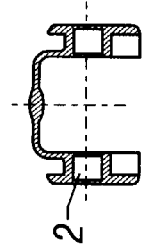

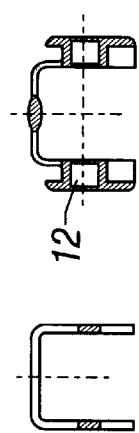
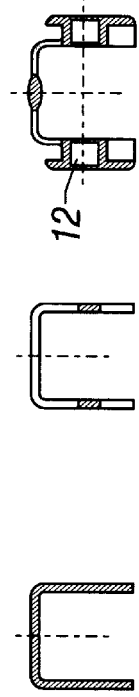
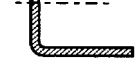
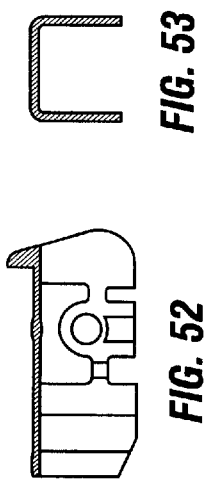
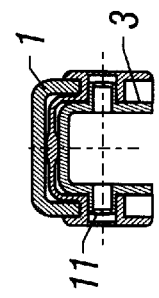
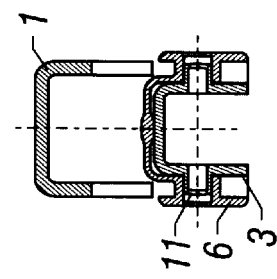
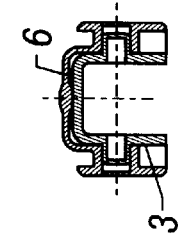
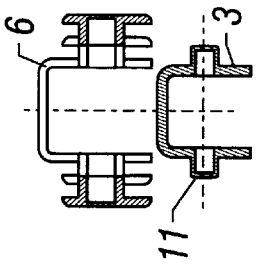
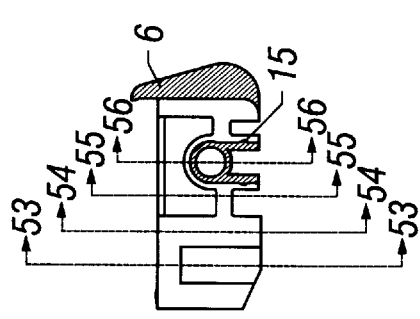

WIPER BLADE AND A METHOD OF MANUFACTURING A WIPER BLADE

The invention relates to a wiper blade, for example for a windscreen wiper device for a vehicle, comprising a metal yoke which is attached to a metal carrier in such manner as to be capable of pivoting movement about a pivot axis, with the interposition of a joint part of plastic material, which is stationary with respect to said carrier, whereby both said carrier and said yoke have a substantially U-shaped cross-section at the location of their interconnection, and whereby said yoke is positioned substantially within said carrier, with the interposition of said joint part.

The material of the joint part is referred to as plastic, which include any synthetic material having some flexibility.

A wiper blade of this type is usually provided with a plurality of yokes, in order to ensure that the wiper blade is in contact with the, usually curved, windscreen along its entire length. Each yoke is thereby pivoted to the end of a carrier in its central portion, which carrier itself may also be a yoke. The invention particularly relates to the manner in which the central portion of a yoke is pivoted to the end of a carrier.

With a joint of this type said pivoting of the yoke must take place substantially without any friction, whilst the joint must be extremely wear resistant. During use of a wiper blade relatively great, varying forces are exerted on the pivoted joint, whilst the yoke keeps pivoting almost constantly. In order to enhance the durability of the joint it is known to make the joint part of plastic material and mount it between the yoke and the carrier in such a manner that the two parts, which move relative to each other and which are both made of a metal, do not come into contact with one another.

EP-A-0412145 describes a wiper blade whereby the carrier and the yoke are pivotally interconnected by means of a pivot pin, which is secured in the yoke and which can rotate in two holes provided coaxially in the carrier. In order to prevent the metal pivot pin, which rotates in the carrier, from coming into direct contact with the carrier, said carrier is provided with a plastic part which extends into the said holes of the carrier. The pivot pin rotates in the plastic part, therefore.

EP-A-0631914 describes a wiper blade likewise comprising a pivot pin, whereby said pivot pin does not rotate in the plastic part, however, but is fixedly provided therein, so that the pivot pin, together with the plastic part, forms the joint part between the carrier and the yoke. The yoke thereby rotates with respect to the joint part.

The object of the invention is to provide a joint between the end of a carrier and the central portion of a yoke, whereby it is possible to realize a reliable construction comprising only a few parts.

In order to accomplish that objective the yoke is in each leg of the U-shaped cross-section provided with a protrusion at the location of the pivot axis, which protrusion pivotally engages in the joint part. This makes it possible to realize an effectively operating and reliable joint, whilst minimizing the number of parts. In particular it is possible to refrain from the use of a metal pivot pin.

According to a further aspect of the invention said protrusions may be substantially cylindrical and extend outwards on either side with respect to the yoke. A cylindrical protrusion may be made in a simple manner by means of a stamping operation during the manufacturing of the yoke. Since the protrusions extend outwards the two bearing supports of the yoke are spaced relatively far apart, as a result of which the forces exerted on said bearings are relatively small.

According to a further aspect of the invention the joint part may be attached to the carrier by engaging with projecting parts in recesses provided in the carrier. In this manner, which is known per se, a simple and yet effectively operating attachment of the joint part to the carrier is realized. The recesses in the carrier, into which the parts of the joint part extend, can be provided in the sheet material of the carrier in a simple manner during the manufacturing of said carrier.

According to another aspect of the invention the carrier may have two holes provided coaxially with the pivot axis, whereby a cylindrical portion of the joint part is provided through each of the holes and whereby the protrusion of said yoke extends into said cylindrical part. As a result of this the joint part is maximally supported by the carrier at the location of the bearing of the yoke by means of the protrusions.

The invention furthermore relates to a method of manufacturing a wiper blade as described above, wherein the two protrusions are stamped into the sheet material of which the yoke is made prior to forming said material into the U-shaped cross-section. This operation does not require an additional processing step, because it can be combined with other processing steps.

According to another aspect of the invention the wiper blade may be manufactured by providing the carrier with said joint part prior to positioning the legs of the U-shaped part of the carrier into substantially parallel relationship, whereby parts of said joint part, which abut against the carrier, are bent outwards, whereupon the carrier and the joint part are given their final shape after the yoke comprising the protrusions has been positioned within the joint part. As a result of this the deformation of the carrier into its final shape will cause the yoke to be locked in the joint part.

According to another aspect of the invention the wiper blade may be manufactured by positioning the joint part on the yoke under deformation of the joint part, in such a manner that the protrusions are located within corresponding recesses of the joint part, after which said joint part is fitted in the carrier, being confined therein in such manner as to be blocked against said deformation. Also in this manner the joint part is locked with respect to the yoke, because of the fact that deformation of the slightly flexible joint part is prevented by the presence of the carrier.

Further aspects of the invention, which may be applied both separately and in combination with each other, are mentionned in the claims and will be described with reference to the embodiments.

In order to more fully explain the invention four embodiments of a joint part will be described hereafter with reference to the drawing.

FIGS. 11–16 are sectional views of the joint part according to the first embodiment;

FIGS. 17–20 show the assembly according to the first embodiment;

FIGS. 25–30 are sectional views of the joint part according to the second embodiment;

FIGS. 31–34 show the assembly according to the second embodiment;

FIGS. 51–56 are sectional views of the joint part according to the fourth embodiment;

FIGS. 57–60 show the assembly according to the fourth embodiment.

The embodiments are only schematically illustrated in the various Figures, wherein like parts are numbered alike.

Figure 1:
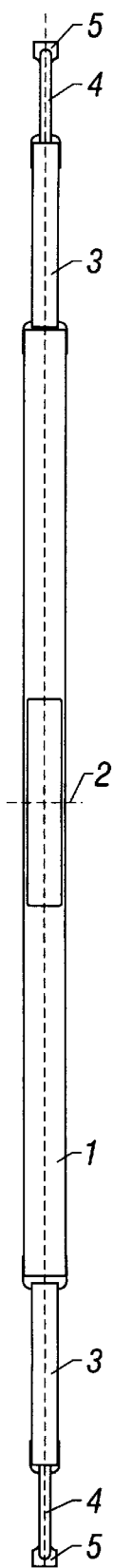
FIG. 1 is a plan view of a wiper blade.
Figure 2:
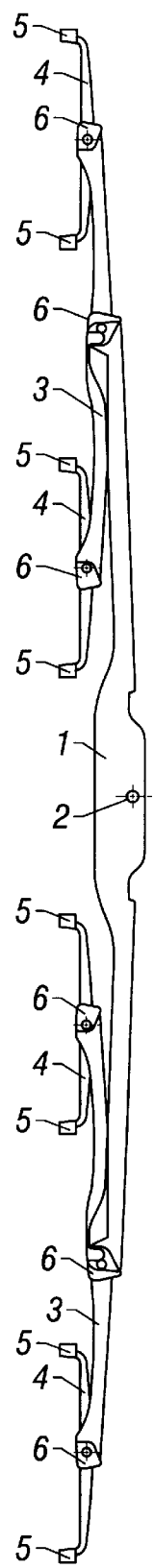
FIG. 2 is a side view of a wiper blade.
Figure 3:
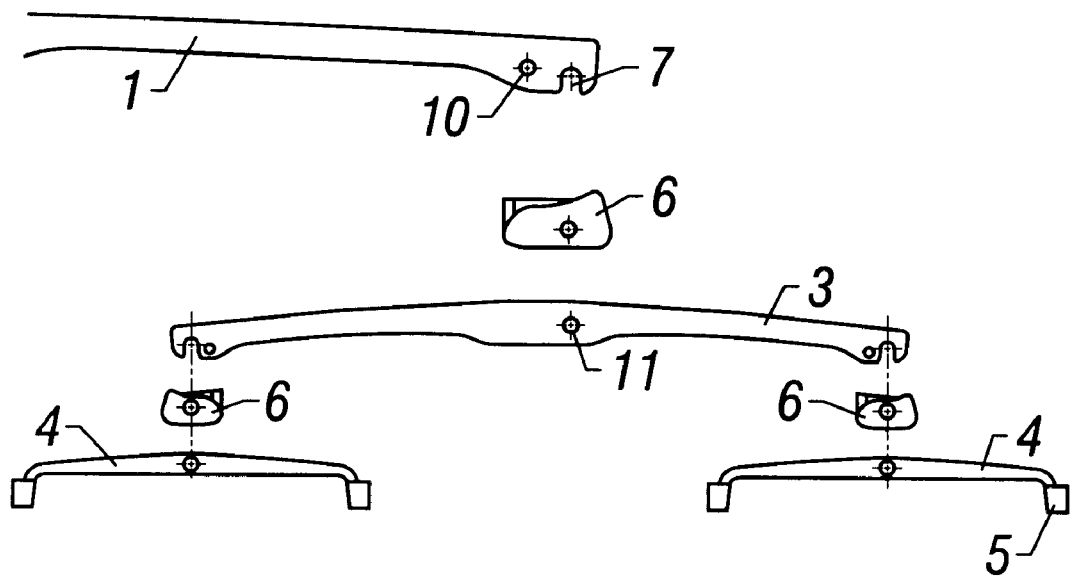
FIGS. 3–6 show four different embodiments of the joint according to the invention.

FIGS. 1 and 2 show the plan view and the side view of a wiper blade, which consists of a first yoke 1, which can be pivotally attached to an oscillating arm of a windscreen wiper device of a vehicle at the location of pivot axis 2. The first yoke 1 functions as the carrier of two secondary yokes 3, which secondary yokes 3 function as the carriers of four tertiary yokes 4. All yokes are pivot-mounted in their respective carriers, so that a force exerted at the location of pivot axis 2 is distributed more or less evenly over the ends of the tertiary yokes 4, capable of being transferred to a rubber wiper means, which can be fitted on the ends 5 of the tertiary yokes 4.

The pivoted joint between each yoke (3,4) and its respective carrier (1,3) is effected with the interposition of a joint part 6, which is made of plastic material.

Figure 6:
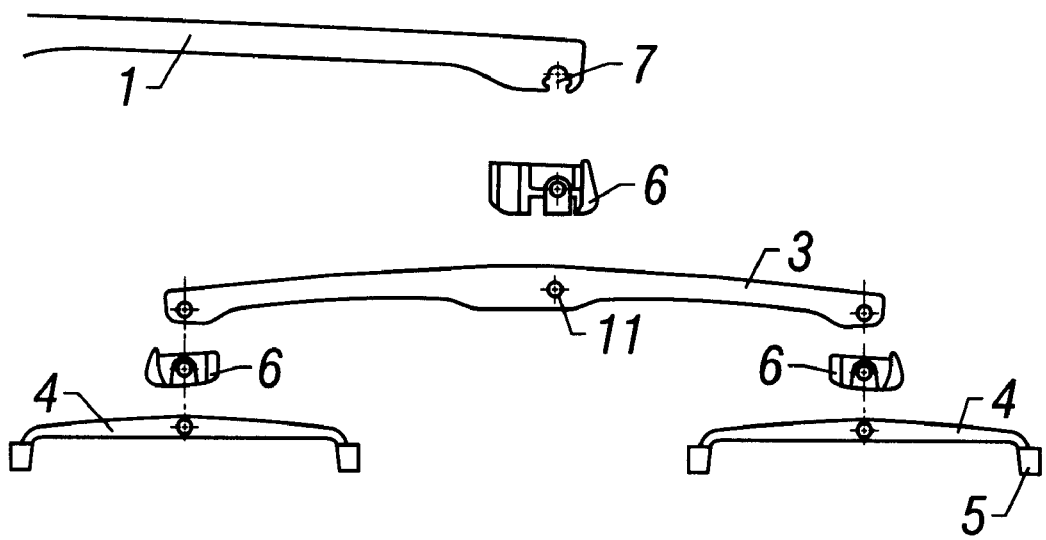
Figure 7:
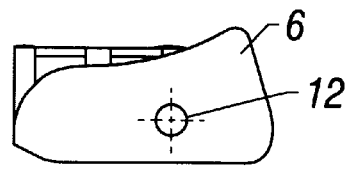
FIGS. 7–10 are elevational views of the joint part according to the first embodiment.
Figure 8:
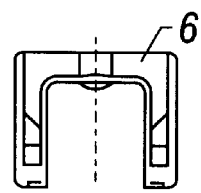
Figure 9:
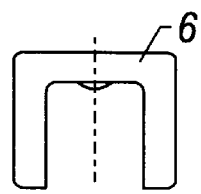

FIGS. 3–6 respectively show the four embodiments to be described in more detail hereafter, and the joint between the carrier 1 (first yoke) and the yoke 3 (secondary yoke) of each part will be explained in more detail with reference to FIGS. 7–60. Said Figures only show the carrier 1 in sectional view at the location of recess 7, whilst yoke 3 is only shown in sectional view at the location of protrusion 11.

Figure 10:
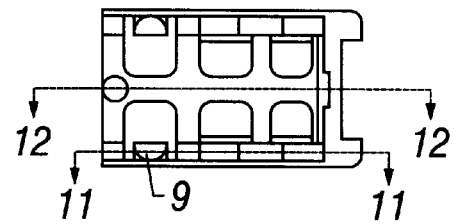
Figure 21:
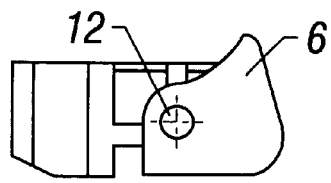
FIGS. 21–24 are elevational views of the joint part according to the second embodiment.
Figure 22:
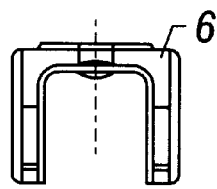
Figure 23:
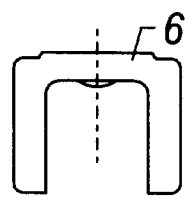
Figure 24:
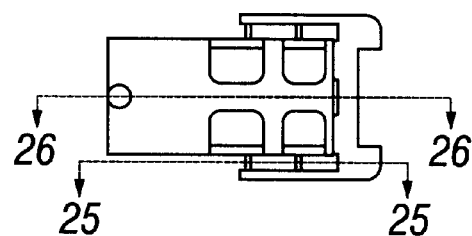
Figure 35:
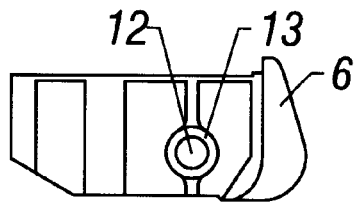
FIGS. 35–38 are elevational views of the joint part according to the third embodiment.
Figure 36:
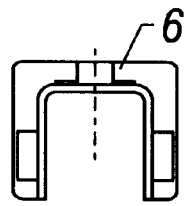
Figure 37:
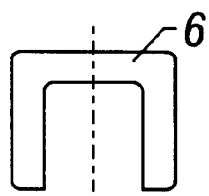
Figure 38:
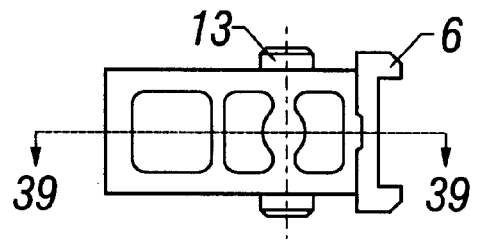
Figure 40:
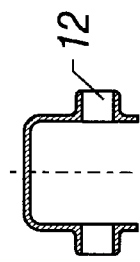
FIGS. 39–42 are sectional views of the joint part according to the third embodiment.
Figure 41:
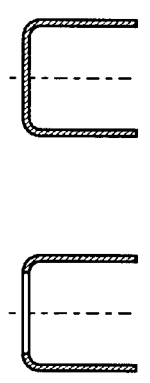
Figure 42:
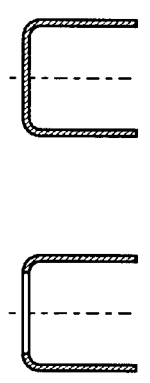
Figure 39:
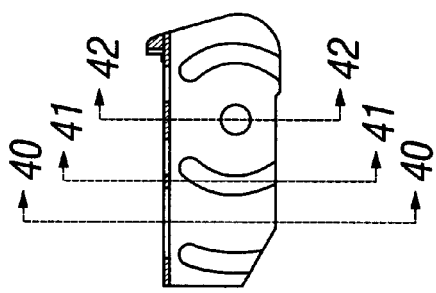

FIGS. 7–20 relate to the first embodiment. The joint part 6 is shown in several elevational views (FIGS. 7–10) and sectional views (FIGS. 11–16), which clearly illustrate the shape of joint part 6. Joint part 6 is not only positioned within the carrier 1, but also to a large extent outside said carrier 1. In order to be attached to carrier 1 joint part 6 is provided with protrusions 9 (FIG. 10), which engage in recesses 10 (FIG. 3) of carrier 1, thus effecting a snap connection.

FIGS. 17–20 show the manner in which joint part 6 is provided. FIG. 17 shows how joint part 6 is placed on yoke 3 under deformation, which yoke 3 is provided with cylindrical protrusions 11, in such a manner that said protrusions 11 will come to lie within holes 12 of joint part 6 (FIG. 18). Then carrier 1 is slid over joint part 6 (FIG. 19), in such a manner that carrier 1 prevents joint part 6 from being deformed such that yoke 3 can be removed.

In this way joint part 6 is fixedly connected with carrier 1, whilst yoke 3 is pivotally journalled in joint part 6 by means of protrusions 11.

Figure 4:
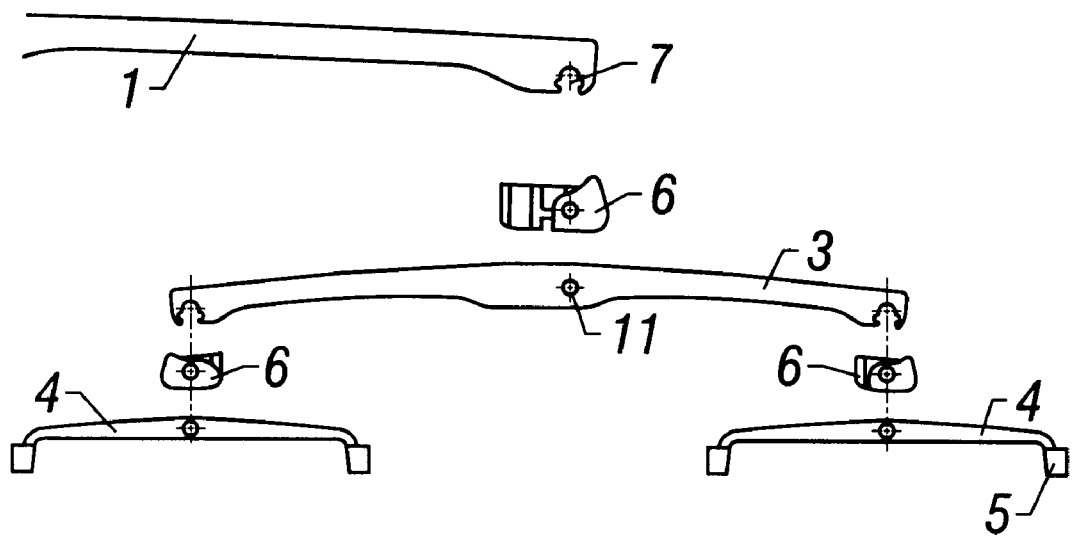
Figure 5:
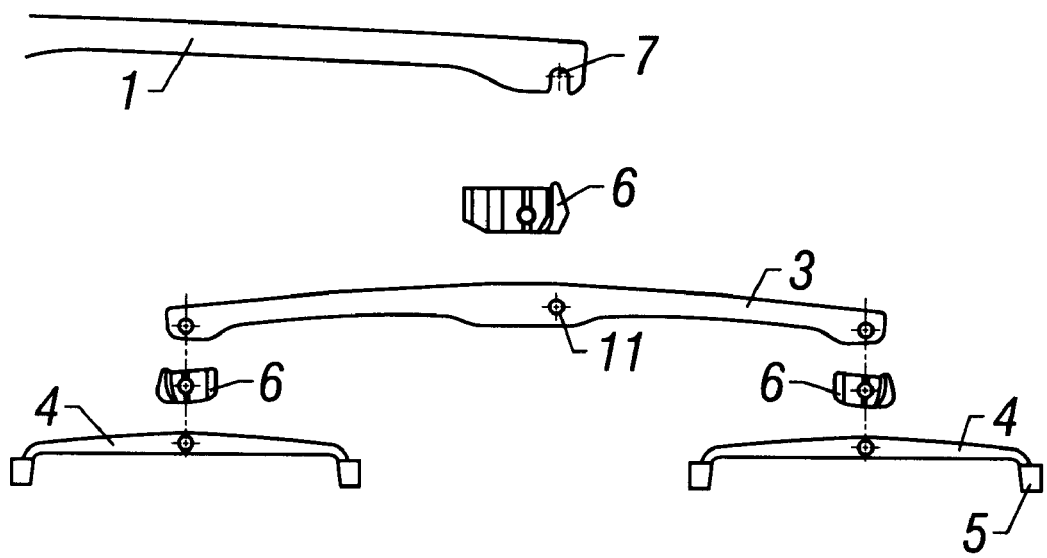

FIGS. 21–34 show the second embodiment. FIGS. 21–24 are elevational views of joint part 6 and FIGS. 25–30 are sectional views of said joint part 6. Joint part 6 is secured in carrier 1 by means of a snap connection, whereby cams 15 (FIG. 25) cooperate with the shape of recess 7 (FIG. 4).

FIG. 31 shows how joint part 6 is first placed on yoke 3 under deformation upon assembly, whereby protrusions 11 extend into holes 12 (FIG. 32). Then joint part 6 is locked against bending back by sliding carrier 1 over joint part 6 (FIGS. 33 and 34).

Figure 46:
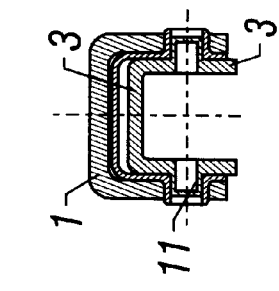
FIGS. 43–46 show the assembly according to the third embodiment.
Figure 45:
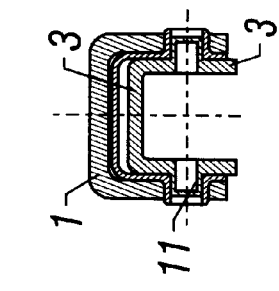
Figure 44:
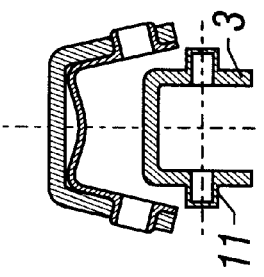
Figure 43:
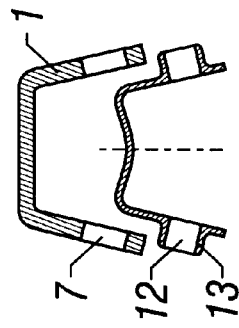
Figure 47:
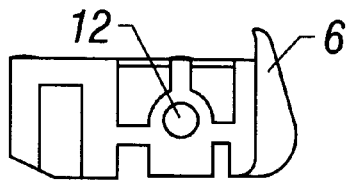
FIGS. 47–50 are elevational views of the joint part according to the fourth embodiment.
Figure 48:
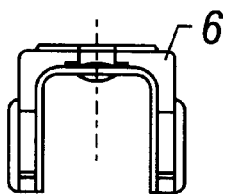
Figure 49:
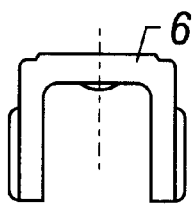
Figure 50:
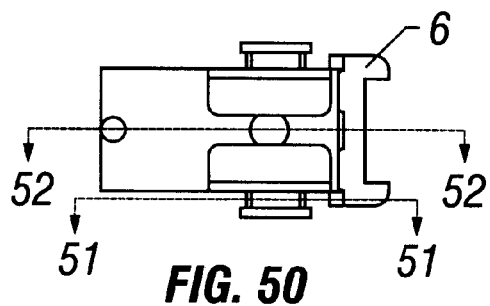

FIGS. 35–46 show the third embodiment, whereby FIGS. 35–38 are elevational views and FIGS. 39–42 are sectional views of the joint part 6. In this embodiment assembly takes place in that carrier 1 has not yet been given its final shape comprising a U-shaped cross-section when joint part 6 is being fitted. When the legs of said U-shaped cross-section are still in a position in which they extend slightly away from each other (FIG. 43), joint part 6 is placed into carrier 1, and that in such a manner that cylindrical parts 13 of joint part 6 extend into recesses 7 of carrier 1 (FIG. 44). Then yoke 3 is positioned within said assembly (FIG. 45), after which carrier 1 is given its final shape by deformation of the material (FIG. 46). Protrusions 11 thereby extend into holes 12 provided in the cylindrical parts 13 of joint part 6. Also in this embodiment the locking of joint part 6 with respect to yoke 3 is effected in that deformation of joint part 6 is prevented by carrier 1.

FIGS. 47–60 show the fourth embodiment, whereby FIGS. 47–50 are elevational views and FIGS. 51–56 are sectional views of the joint part 6. In this embodiment assembly takes place (FIGS. 57–60) by deformation of joint part 6 (FIG. 57), so that said joint part can be placed on yoke 3. Then carrier 1 is slid over joint part 6 (FIG. 59), whereby said joint part snaps into carrier 1 as a result of the cooperation between cams 15 (FIG. 51) and the shape of recess 7 (FIG. 6). Also in this embodiment an effective and reliable joint between carrier 1 and yoke 3 is realized with a minimum number of parts.

I claim:

1. A wiper blade for a vehicle, the wiper blade comprising:

a metal carrier;

a metal yoke which is attached to the metal carrier in such manner as to be capable of pivoting movement about a pivot axis; and a joint part of plastic material interposed between the metal carrier and the metal yoke, the joint part being stationary with respect to the carrier, wherein:

both the carrier and the yoke have a substantially U-shaped cross-section at the location at which the joint part is interposed between them;

the yoke is positioned substantially within said carrier;

at least one leg of the U-shaped cross-section of the yoke includes a protrusion of one piece therewith at the location of the pivot axis, the protrusion pivotally engaging in the joint part;

the carrier has at least one hole provided coaxially with the pivot axis;

a cylindrical portion of the joint part is provided through the at least one hole; and the at least one protrusion of the yoke extends into the cylindrical portion of the joint part.

2. A wiper blade according to claim 1, wherein the at least one protrusion is substantially cylindrical.

3. A wiper blade according to claim 1 or claim 2, wherein each leg of the U-shaped cross section of the yoke includes said protrusion, and the protrusions extend outward on either side of the yoke.

4. A wiper blade according to claim 1 or claim 2, wherein the joint part is attached to the carrier by engaging projecting parts of the joint part in recesses provided in the carrier.

5. A wiper blade according to claim 1 or claim 2, wherein:

the carrier has two holes provided coaxially with the pivot axis, a cylindrical portion of the joint part is provided through each of the holes, each leg of the U-shaped cross section of the yoke includes said protrusion, and the protrusions of the yoke extend into the cylindrical portion of the joint part.

6. A wiper blade according to claim 1 or claim 2, wherein the at least one hole in the carrier is substantially circular.

7. A wiper blade according to claim 1 or claim 2, wherein the at least one protrusion of the yoke extends into the at least one hole of the carrier.

8. A vehicle including the wiper blade according to claim 1 or claim 2.

9. A method of manufacturing a wiper blade according to claim 1 or claim 2, wherein:

the carrier is provided with the joint part prior to positioning legs of the U-shaped part of the carrier into substantially parallel relationship, parts of the joint part abutting against the carrier are bent outwards, the carrier and the joint part are given their final shapes after the yoke has been placed within the joint part.

* * * * *